(12) United States Patent
Cho

(10) Patent No.: US 7,118,265 B2
(45) Date of Patent: Oct. 10, 2006

(54) OPTICAL MEMBER, BACKLIGHT ASSEMBLY AND LIQUID CRYSTAL DISPLAY DEVICE USING THE SAME

(75) Inventor: Chun-Hyun Cho, Suwon-si (KR)

(73) Assignee: Samsung Electronics Co., Ltd., (KR)

( * ) Notice: Subject to any disclaimer, the term of this patent is extended or adjusted under 35 U.S.C. 154(b) by 68 days.

(21) Appl. No.: 10/523,781

(22) PCT Filed: Dec. 30, 2002

(86) PCT No.: PCT/KR02/02485

§ 371 (c)(1),
(2), (4) Date: Feb. 9, 2005

(87) PCT Pub. No.: WO2004/015490

PCT Pub. Date: Feb. 19, 2004

(65) Prior Publication Data

US 2006/0007367 A1    Jan. 12, 2006

(30) Foreign Application Priority Data

Aug. 13, 2002  (KR) .................. 10-2002-0047716

(51) Int. Cl.
*G02F 33/57* (2006.01)
(52) U.S. Cl. .................. 362/606; 362/561; 349/58
(58) Field of Classification Search ............ 362/561, 362/606, 632–634, 511
See application file for complete search history.

(56) References Cited

U.S. PATENT DOCUMENTS

| | | | |
|---|---|---|---|
| 4,441,677 A * | 4/1984 | Byerly ............... 248/74.3 |
| 5,467,208 A | 11/1995 | Kokawa et al. ............... 359/49 |
| 6,285,125 B1 | 9/2001 | Mizuno ................. 313/512 |
| 6,392,724 B1 | 5/2002 | An et al. .................. 349/58 |
| 6,654,078 B1 * | 11/2003 | Kato et al. ................. 349/58 |
| 6,808,148 B1 * | 10/2004 | Eakle et al. ............ 248/309.1 |
| 6,950,154 B1 * | 9/2005 | Lee ......................... 349/58 |
| 2001/0048492 A1 * | 12/2001 | Natsuyama ................ 349/58 |
| 2003/0222194 A1 * | 12/2003 | Platus .................... 248/619 |
| 2005/0001037 A1 * | 1/2005 | Wulff .................. 235/462.43 |

OTHER PUBLICATIONS

PCT International Search Report; International Application No. PCT/KR02/02485; International Filing date: Dec. 30, 2002; Date of Mailing: Apr. 10, 2003.

* cited by examiner

*Primary Examiner*—Renee Luebke
*Assistant Examiner*—Jessica McMillan
(74) *Attorney, Agent, or Firm*—Cantor Colburn LLP

(57) ABSTRACT

Disclosed are an optical member (100), a backlight assembly (500) and a liquid crystal display device (800) using the optical member. The optical member (100) includes an optical body (110) and a first fixing part (120). The optical body varies optical characteristic of first light incident into thereto to exit a second light. The first fixing part (120) is protruded from at least one side face of the optical body (110), and including a fixing hole (122) and a vibration attenuating means (124). The fixing hole (122) is elongated in a main expansion direction of the optical body (110), and the vibration attenuating means (124) is formed on an inner of the fixing hole to attenuate external vibration applied to the optical body (110). The fixing hole (122) allows movement of the optical member (100) in accordance with expansion of the optical member (100) caused by heat, thereby preventing wrinkles from being created on the optical body. The vibration attenuating member (124) prevents the optical body from being scratched.

20 Claims, 11 Drawing Sheets

OPTICAL MEMBER, BACKLIGHT ASSEMBLY AND LIQUID CRYSTAL DISPLAY DEVICE USING THE SAME

TECHNICAL FIELD

The disclosure relates to an optical member, a backlight assembly and a liquid crystal display (LCD) device using the same, and more particularly to an optical member, a backlight assembly and a liquid crystal display device using the same, the optical member capable of preventing scratches from being created on the optical member due to external vibration without using an adhesive member, and allowing an movement of the optical member in accordance with expansion and contraction of the optical member caused by heat.

BACKGROUND ART

A liquid crystal display device is an appliance for displaying images by using liquid crystal.

In order to display images, a conventional liquid crystal display device includes a light supplying part for generating light required for displaying images, an optical part for making brightness distribution of the light to be uniform, and a liquid crystal control part for controlling the liquid crystal.

For example, the light supplying part of the liquid crystal display device includes a cold cathode fluorescent lamp (CCFL) that generates white light and has a relatively low heat-producing rate with long life span.

The optical part uniformly distributes the brightness of the light generated from the CCFL. Although there is a small difference according to kinds of the liquid crystal display devices to be used, the optical part basically includes an optical sheet.

The optical sheet includes a diffusion sheet for uniformly distributing the brightness of the light generated from the CCFL by diffusing the light generated from the CCFL, and a prism sheet for collecting a light exiting from the diffusion sheet.

The optical part may have a light guiding plate. The light guiding plate changes the light generated from the CCFL into a light having an optical distribution of a surface light source.

The liquid crystal control part controls the liquid crystal in a pixel unit, such that transmissivity of light processed by the optical part can be controlled in a pixel unit. Thus, images are displayed by the liquid crystal control part.

Among the light supplying part, especially the optical part affects a great influence on display quality of the liquid crystal display device.

The above-mentioned diffusion sheet or prism sheet of the optical part is fixed by using a double-faced adhesive tape, or fixed to a boss by forming a hole at an extension part of the diffusion sheet or the prism sheet.

However, since the optical part is manufactured to have a thin sheet shape by using synthetic resin, the optical part easily expands by heat.

When the optical part expands in a state that the optical sheet is securely fixed by the double-faced adhesive tape, wrinkles are created on the optical part, so that display quality is deteriorated. In other words, the wrinkles created on the optical part cause stains to be shown when images are displayed.

In order to solve the above problem, there is an attempt to movably fix the optical part.

However, when the optical part is movably fixed, the optical part makes a friction with respect to the liquid crystal control part that is adjacent to the optical part due to external vibration applied to the optical part.

When friction occurs between the optical part and the liquid crystal control part, scratches are created on the liquid crystal control part or the optical part, thereby deteriorating display quality.

DISCLOSURE OF THE INVENTION

The present invention has been made to solve the above problems of prior arts, therefore, it is a first object of the present invention to provide an optical member capable of preventing scratches from being created on the optical member due to expansion of the optical member caused by heat and due to external vibration applied the optical member, without using an adhesive member.

A second object of the present invention is to provide a backlight assembly capable of displaying superior quality of images by preventing an optical member from being scratched due to expansion of the optical member caused by heat and due to external vibration applied the optical member, without using an adhesive member.

A third object of the present invention is to provide a liquid crystal display device capable of displaying superior quality of images by preventing an optical member from being scratched due to expansion of the optical member caused by heat and due to external vibration applied the optical member, without using an adhesive member.

To achieve the first object of the present invention, there is provided an optical member of a liquid crystal display device, the optical member comprising: an optical body for varying an optical characteristic of a first light incident into the optical body to exit a second light; and a first fixing part protruded from at least one side face of the optical body, the first fixing part including a fixing hole and a vibration attenuating means, the fixing hole allowing an movement of the optical body in accordance with an expansion and a contraction of the optical body, and the vibration attenuating means formed on an inner surface of the fixing hole to attenuate an external vibration applied to the optical body.

To achieve the second object of the present invention, there is provided a backlight assembly comprising: a receiving container including i) a bottom face, ii) sidewalls protruded from edges of the bottom face to provide a receiving space, iii) a recess respectively formed on an upper portion of two opposite sidewalls of the receiving container, and iv) a fixing boss formed on a bottom surface of the recess and projected in parallel to the sidewalls; a lamp, received in the receiving container, for generating a first light; a first optical member, coupled to the lamp, for varying an optical characteristic of the first light to exit a second light; and a second optical member including i) an optical body for varying the optical characteristic of the second light incident into the optical body to exit a third light, and ii) a first fixing part protruded from at least one side face of the optical body, the first fixing part including a fixing hole and a first vibration attenuating means, and the vibration attenuating means formed on a first inner surface of the fixing hole and the first fixing part to attenuate an external vibration applied to the optical body.

To achieve the third object of the present invention, there is provided a liquid crystal display device comprising: a receiving container including i) a bottom face, ii) sidewalls protruded from edges of the bottom face to provide a receiving space, iii) a recess respectively formed on an upper portion of two opposite sidewalls of the receiving container, and iv) a fixing boss formed on a bottom surface of the recess and projected in parallel to the sidewalls; an optical module including a lamp and a first optical member, the lamp received in the receiving container to generate a first light, and the first optical member varying an optical characteristic of the first light to exit a second light; a second optical member including i) an optical body for varying the optical characteristic of the second light incident into the optical body to exit a third light, and ii) a first fixing part protruded from at least one side face of the optical body, the first fixing part including a fixing hole and a first vibration attenuating means, the fixing hole being elongated in a main expansion direction of the optical body to receive the fixing boss, and the vibration attenuating means being formed on an inner surface of the fixing hole to attenuate an external vibration applied to the optical body; a liquid crystal display panel assembly, disposed on the second optical member to be received in the receiving container, for changing the third light into a fourth light having image information; and a chassis, coupled to the receiving container on which the liquid crystal display panel assembly is received, for preventing the liquid crystal display panel assembly from being separated from the receiving container.

According to the present invention, the liquid crystal display device can display superior quality of images by absorbing external vibration applied thereto and simultaneously by allowing expansion of an optical member caused by heat generated from a lamp without deteriorating display quality.

BRIEF DESCRIPTION OF THE DRAWINGS

The above objects and other advantages of the present invention will become more apparent by describing in detail preferred embodiments thereof with reference to the attached drawings in which.

BEST MODE FOR CARRYING OUT THE INVENTION

Figure 1:
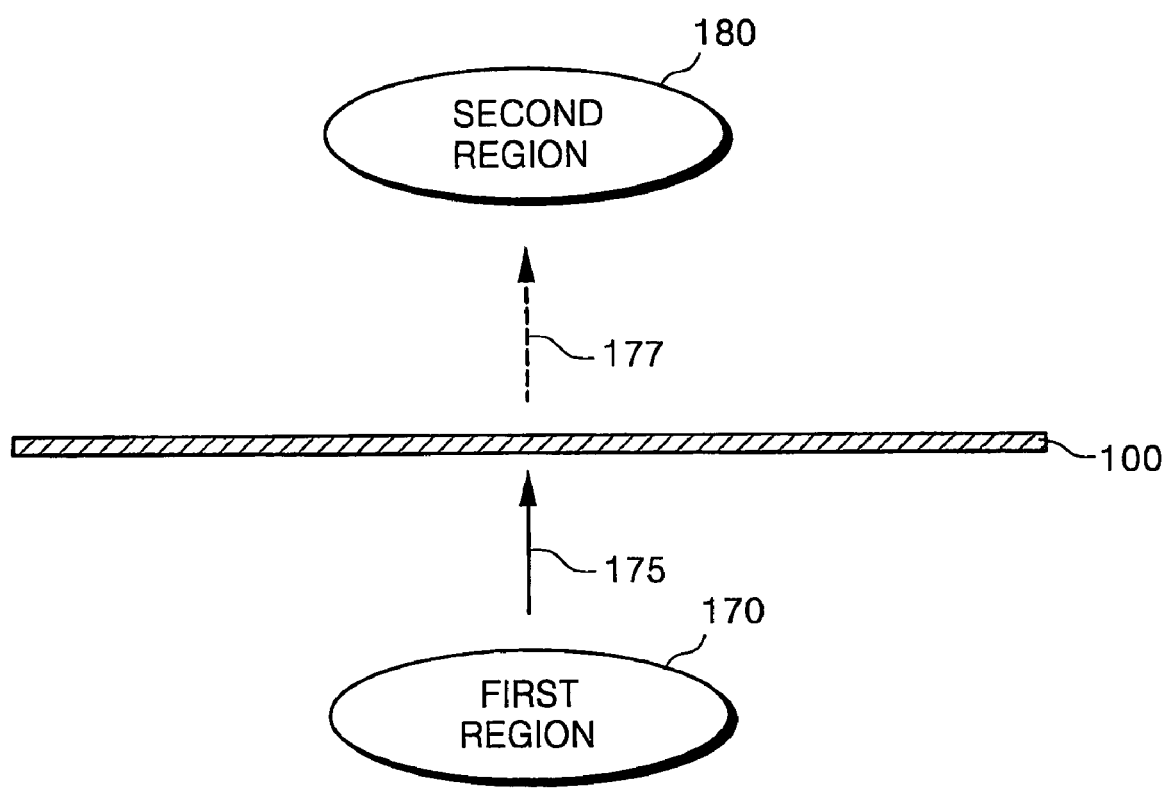
FIG. 1 is a side view showing an optical member according to a first exemplary embodiment of the present invention.

Hereinafter, the present invention will be described in detail with reference to accompanying drawings. The same reference numerals are used to refer the same elements.

Embodiment 1

FIG. 1 is a side view showing an optical member 100 according to a first exemplary embodiment of the present invention.

Referring to FIG. 1, the optical member 100 varies optical characteristics of a first light 175 generated in a first region 170 to exit a second light 177 towards a second region 180.

The optical characteristics include, for example, brightness uniformity of light, orientation of light, and light usage efficiency.

When the optical member 100 satisfies the above optical characteristics, only one sheet of optical member 100 may be used. However, since it is difficult to satisfy the brightness uniformity of light, the orientation of light, and the light usage efficiency by means of only one sheet of optical member, three sheets of optical members 100 are typically employed.

The optical member 100 includes a diffusion sheet that exits a second light 177 by enhancing brightness uniformity of the first light 175.

The diffusion sheet diffuses the first light 175 in order to exit the second light 177 having uniform brightness over the entire area of the optical member 100.

In addition, the optical member 100 further includes a prism sheet that exits a second light 177 by enhancing a viewing angle of the first light 175.

The prism sheet varies a direction of the first light 175 so that the direction of the first light 175 may be substantially vertical to an upper surface of the optical member 100, thereby exiting a second light 177 having an broaden viewing angle.

The optical member 100 further includes a dual brightness enhanced film (DBEF) for improving the usage efficiency of the first light 175. The DBEF reproduces the first light 175 to exit a second light 177 with maximized light usage efficiency and enhanced brightness uniformity.

Figure 2:
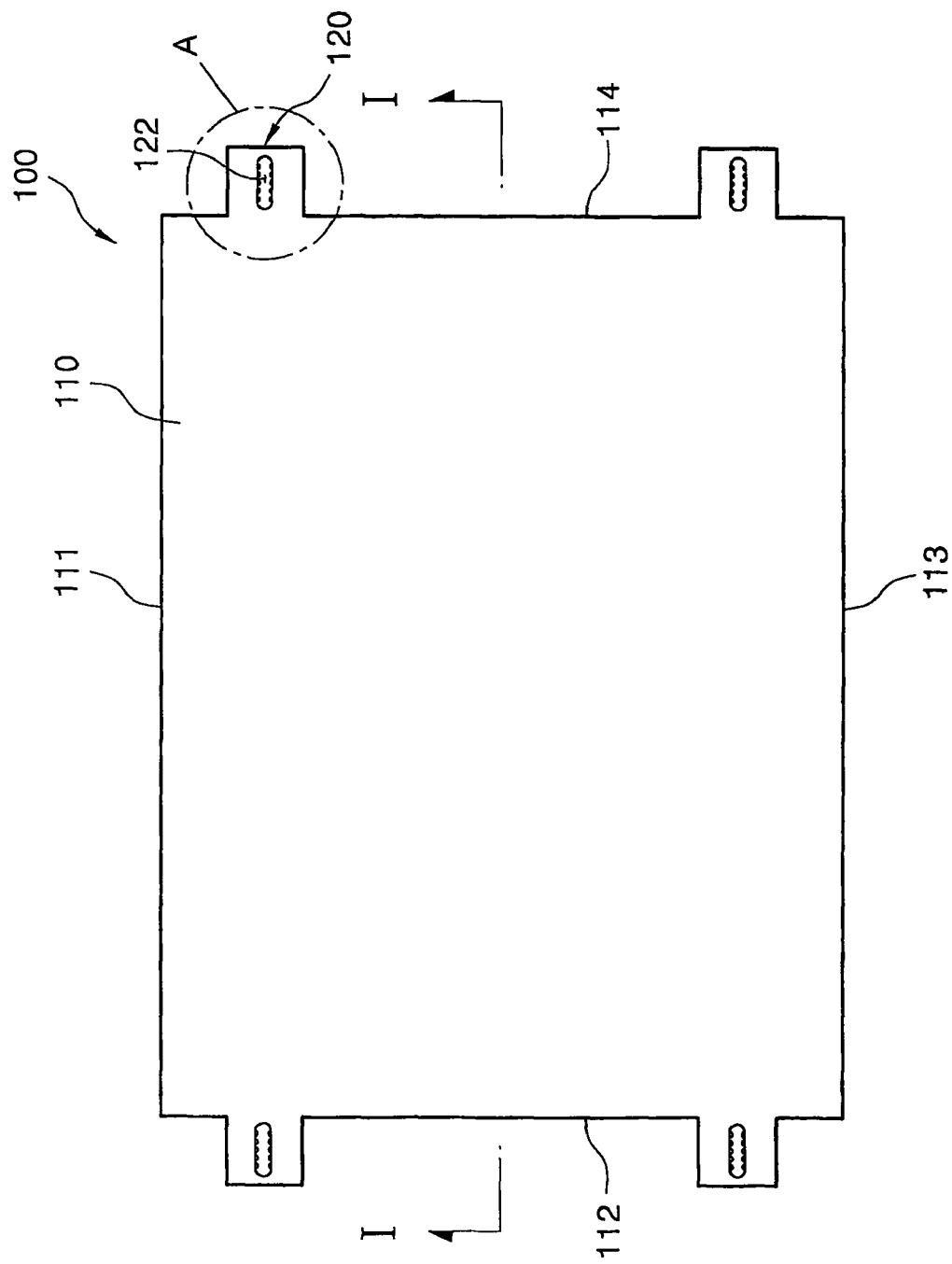
FIG. 2 is a plan view showing one of an optical member according to a first exemplary embodiment of the present invention.

FIG. 2 is a plan view showing one of the optical members according to the first exemplary embodiment of the present invention.

Referring to FIG. 2, each optical member 100 having various optical characteristics commonly has a thin plate shape or a sheet shape.

The optical member 100 includes an optical body 110 and a first fixing part 120.

The optical body 110 enhances the brightness uniformity, orientation or usage efficiency of the first light 175.

Preferably, the optical body 110 has a rectangular parallelepiped shape. Thus, the optical body 110 has four side faces. Reference numerals 111, 112, 113 and 114 represent the four side faces, respectively.

The first fixing part 120 is provided to fix the optical body 110 having the above shape.

The first fixing part 120 may be formed on the optical body 110 without changing the shape of the optical body 110. However, it is not desirous to form the first fixing part 120 on the optical body 110 without changing the shape of the optical body 110, because optical functions of the optical body 110 may be weakened.

For this reason, as shown in FIG. 2, the fixing part 120 is protruded from the side faces of the optical body 110. Preferably, a pair of first fixing parts 120 are protruded from two opposite side faces 112 and 114, respectively. The fixing parts 120 formed on a side face of the optical body 110 are spaced from each other.

The fixing part 120 not only fixes the optical body 110, but also prevents display quality from being lowered even if the optical body 110 is expanded due to heat or external vibration is applied to the optical body 110.

Figure 3:
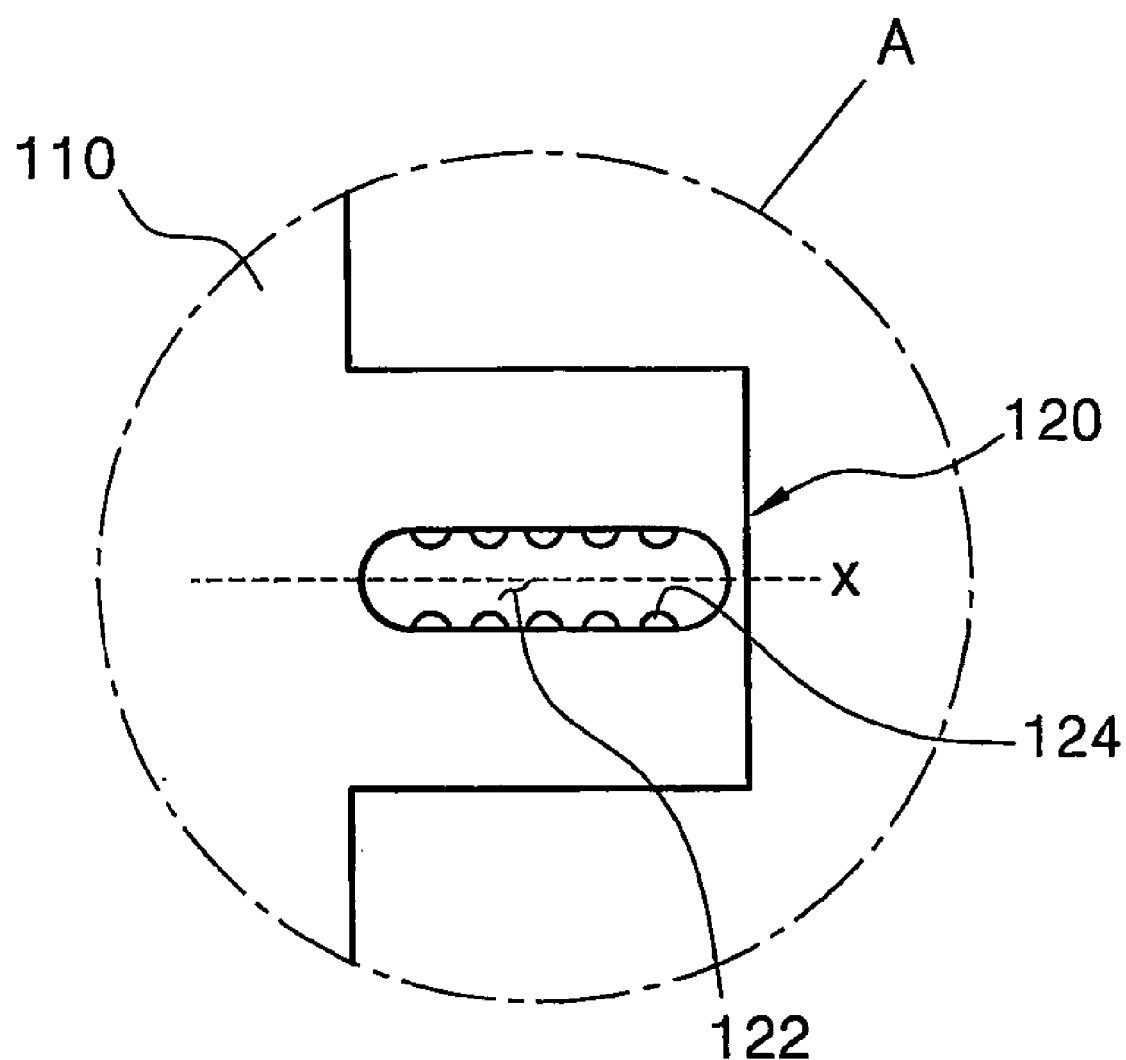
FIG. 3 is an enlarged view of "A" shown in FIG. 2.

FIG. 3 is an enlarged view of "A" shown in FIG. 2.

Referring to FIG. 3, the first fixing part 120 has a fixing hole 122 and vibration attenuating protrusions 124.

The fixing hole 122 prevents wrinkles from being created on the optical body 110 when the optical body 110 is expanded due to heat, and allows the optical body 110 to be fixed to a predetermined position.

For example, the fixing hole 122 has a shape of an elongated hole having a long axis in a predetermined direction so as to prevent wrinkles from being created on the optical body 110. In this case, a major axis direction ('X') of the elongated fixing hole 122 is very important. The major axis direction ('x') of the elongated fixing hole 122 matches with a main expanding direction of the optical body 110.

While optical body 110 is movable due to the fixing hole 122 in the main expanding direction of the optical body 110, the vibration attenuating protrusion 124 attenuates the external vibration applied to the optical body 110. At least one vibration attenuating protrusion 124 is protruded from an inner surface of the fixing hole 122 toward a center of the fixing hole 122.

The vibration attenuating protrusion 124 makes contact with an element (not shown) inserted into the fixing hole 122 to absorb external vibration applied to the optical body 110.

It is preferred to provide many vibration attenuating protrusions 124 having a small size at the inner surface of the fixing hole 122 and the fixing part 120. The vibration attenuating protrusions 124 may be arranged exactly opposite to each other or athwart opposite each other with respect to the major axis of the fixing hole 122.

Embodiment 2

Figure 4:
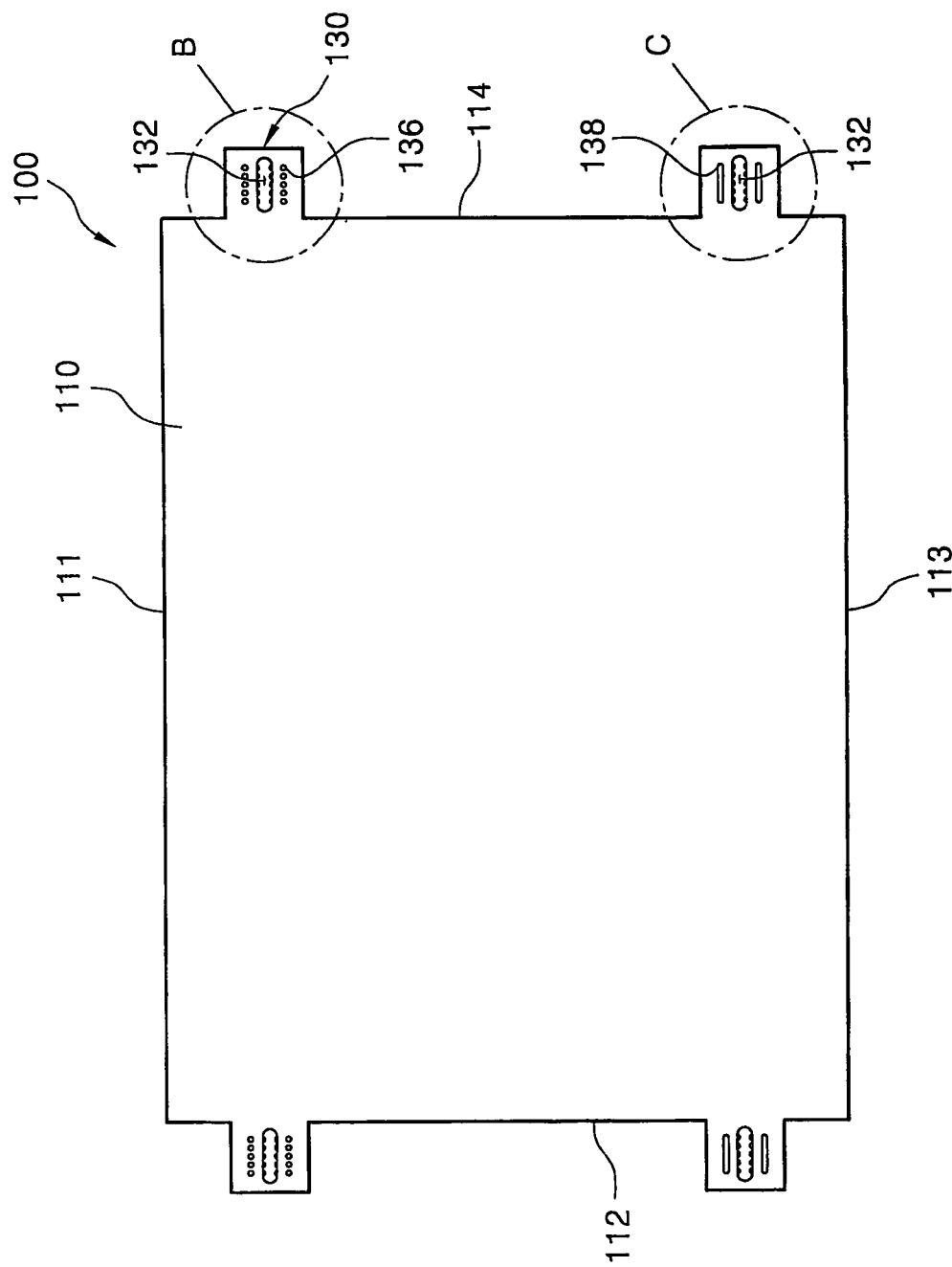
FIG. 4 is a plan view showing an optical member according to a second exemplary embodiment of the present invention.

FIG. 4 is a plan view showing an optical member 100 according to a second exemplary embodiment of the present invention.

Referring to FIG. 4, the optical member 100 includes an optical body 110 and a first fixing part 130.

The optical body 110 has a rectangular parallelepiped sheet shape or a rectangular parallelepiped plate shape. Thus, the optical body 110 has four side faces 111, 112, 113 and 114.

At least one fixing part 130 is protruded from two opposite side faces 112 and 114, respectively.

Preferably, a pair of first fixing parts 120 are protruded from two opposite side faces 112 and 114, respectively. The fixing parts 120 formed on a side face of the optical body 110 are spaced from each other. The fixing parts 120 are protruded in parallel to an upper (or lower) surface of the optical body 130.

Figure 5:
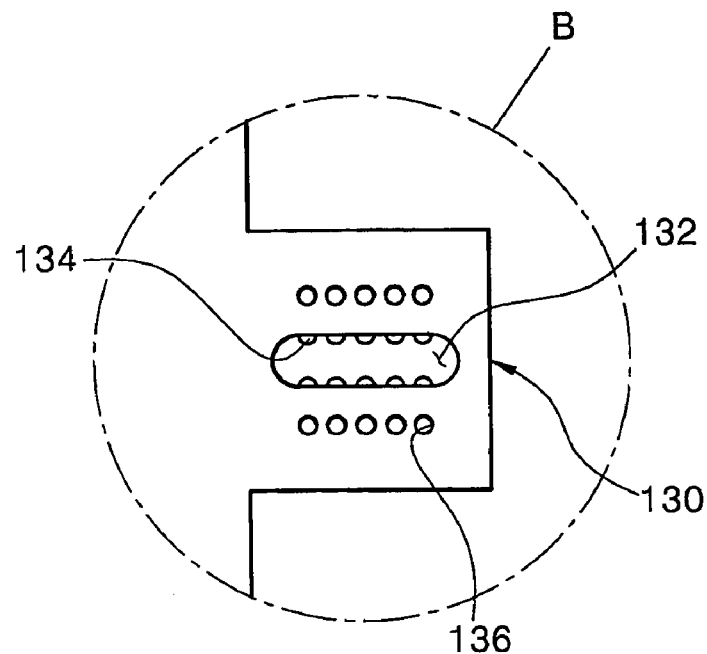
FIG. 5 is an enlarged view of "B" shown in FIG. 4.

FIG. 5 is an enlarged view of "B" shown in FIG. 4.

Referring to FIG. 5, the first fixing part 130 has a fixing hole 132 and a vibration attenuating protrusion 134 identical to the fixing hole 122 and the vibration attenuating protrusion 124 described in the first exemplary embodiment. In addition, at least one first through-hole 136 is formed adjacent to the fixing hole 132. Specifically, at least one through-hole is formed on a portion of the first fixing part 130. The portion is disposed on a circumference of the fixing hole 132, is a predetermined distance apart from the fixing hole 132. For example, five first through-holes 136 are formed on the portion of the first fixing part 130. The first through-holes 136 are arranged at one side or both sides of the fixing hole 132 in a row.

Figure 6:
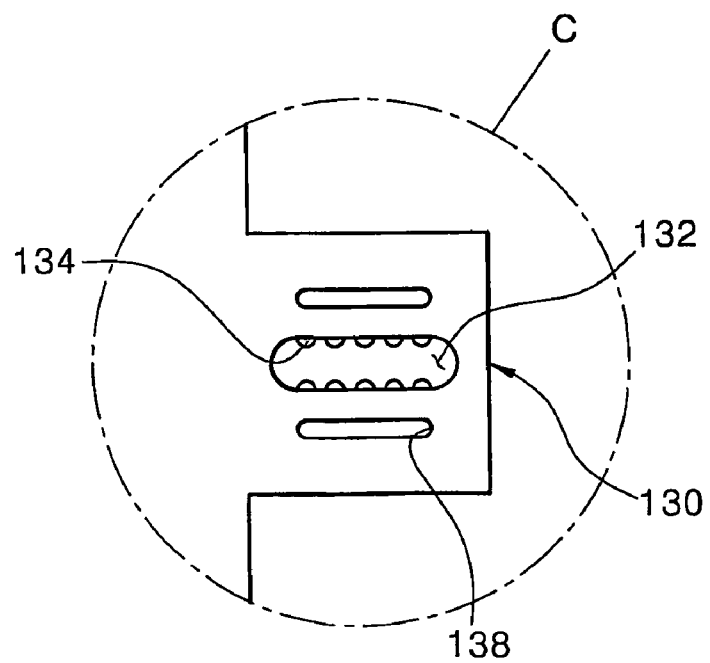
FIG. 6 is an enlarged view of "C" shown in FIG. 4.

FIG. 6 is an enlarged view of "C" shown in FIG. 4.

Referring to FIG. 6, a second through-hole 138 may be respectively formed on a first portion and a second portion of the first fixing part 130. The second through-holes 138 formed on the first and second portions are disposed to face each other. A major axis of each of the second through-holes 138 is parallel to the major axis of the fixing holes 132.

A shape of the first and second through-holes 136 and 138 is not limited to above shape, and the first and second through-holes 136 and 138 may be formed in various shapes so as to allow an element (not shown) to be easily inserted into the fixing hole 132.

Embodiment 3

Figure 7:
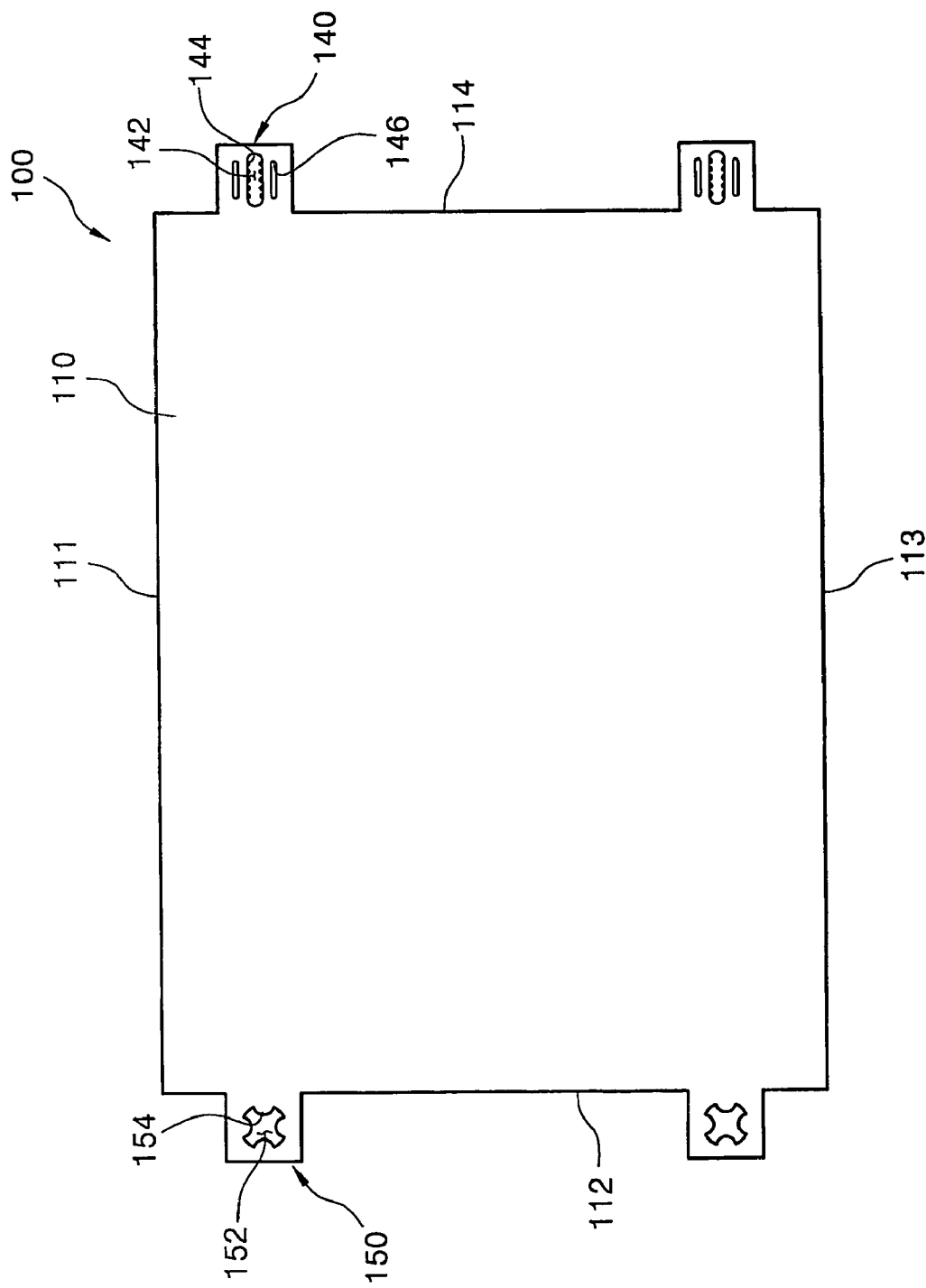
FIG. 7 is a plan view showing an optical member according to a third exemplary embodiment of the present invention.

FIG. 7 is a plan view showing an optical member according to a third exemplary embodiment of the present invention.

Referring to FIG. 7, the optical member 100 includes an optical body 110, a first fixing part 140 and a second fixing part 150.

The optical body 110 has a rectangular parallelepiped sheet shape or a rectangular parallelepiped plate shape. Thus, the optical body 110 has four side faces 111, 112, 113 and 114.

The first fixing part 140 is protruded from one side face 114. Preferably, at least one first fixing part 140 or a pair of first fixing parts 140, which are spaced by a predetermined distance from each other, are protruded from the side face 114, respectively.

The first fixing part 140 has a fixing hole 142 and vibration attenuating protrusions 144 identical to the fixing hole 132 and the vibration attenuating protrusions 134 described in the second exemplary embodiment. Thus, the shapes of the fixing hole 142 and the vibration attenuating protrusions 144 will not be further described below to avoid a redundancy.

In addition, at least one first through-hole 146 is formed adjacent to the fixing hole 142. In detail, a pair of first through-holes 146 is formed on the first fixing part 140 opposite to each other about the fixing hole 142.

The second fixing part 150 is formed on the side face 112 of the optical body 110. That is, the second fixing part 150 is opposite to the first fixing part 140.

Preferably, a pair of second fixing parts 150, which are separated from each other by a predetermined distance, are protruded from the side face 112, respectively.

A cylindrical hole 152 and fixing protrusions 154 are formed in the second fixing part 150. At least two fixing protrusions 154 are protruded from an inner surface of the cylindrical hole 152 toward a center of the cylindrical hole 152.

Preferably, four fixing protrusions 154, which are separated from each other at an angle of 90° with respect to a center of the cylindrical hole 152, are formed on the inner surface of the cylindrical hole 152. The fixing protrusions 154 not only fix the optical body 110 in a predetermined position even if the optical body 110 expands due to heat, etc., but also absorb external vibration applied to the optical body 110.

When heat is applied to the optical member 100 having the optical body 110, the first fixing part 140 and the second fixing part 150, the optical body 110 begins to expand.

Since the second fixing part 150 protruded from the optical body 110 is fixed to an element (not shown) inserted into the cylindrical hole 152 when the optical body 110 expands, movement of the optical body 110 in accordance with an expansion and a contraction of the optical body is allowed at the first fixing part 140.

In addition, when the second fixing part 150 is fixed to the element (not shown) inserted into the cylindrical hole 152, external vibration is indirectly transferred to the optical body 110 through the first and second fixing parts 140 and 150. The vibration attenuating protrusion 144 formed in the first fixing part 140 absorbs most of the external vibration so that the optical body 110 can be prevented from being damaged.

Hereinafter, a backlight assembly using the optical member described in the first, second and third exemplary embodiments of the present invention will be described.

Figure 8:
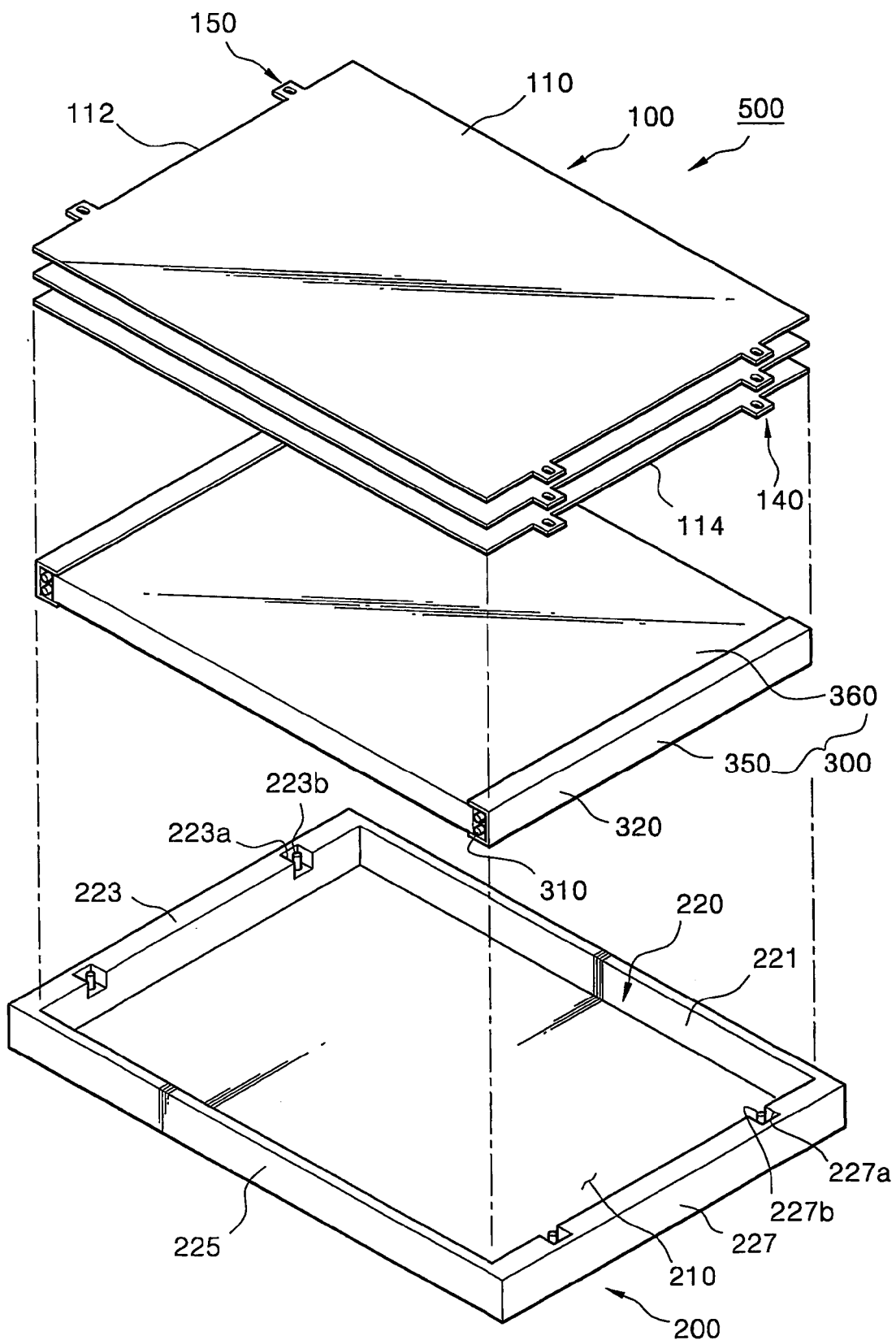
FIG. 8 is a schematic view showing a backlight assembly according to the present invention.

FIG. 8 is a schematic view showing a backlight assembly 500 according to the present invention.

Referring to FIG. 8, the backlight assembly 500 mainly includes a receiving container 200, a lamp assembly 350, a first optical member 360, and a second optical member 100.

The receiving container 200 has a bottom face 210 and sidewalls 220.

The bottom face 210 has a rectangular shape and has four side edges.

The sidewalls 220 extend from the side edges of the bottom face 210 to form a receiving space. The sidewall 220 includes a first, second, third and fourth sidewalls 221, 223, 225, and 227.

Figure 9:
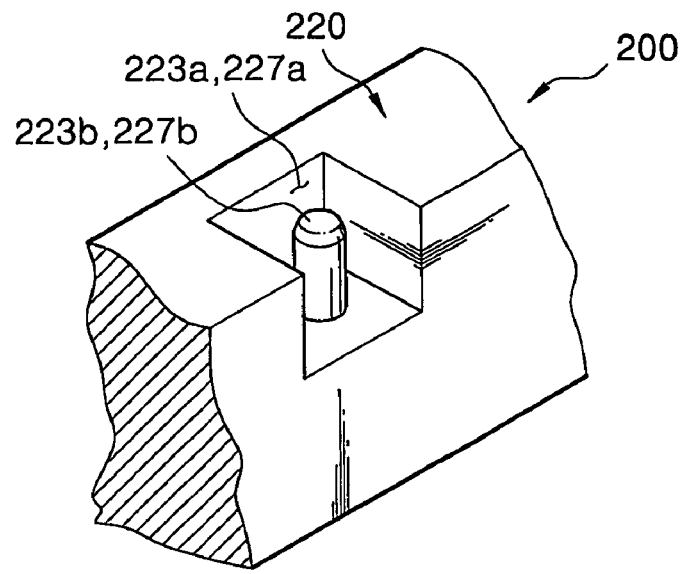
FIG. 9 is a partial sectional perspective view showing a part of a sidewall of a receiving container according to the present invention.

FIG. 9 is a partial sectional perspective view showing a part of a sidewall of a receiving container according to the present invention.

Referring to FIG. 9, recesses 223a and 227a are respectively formed in first and third sidewalls 223 and 227, which are opposite to each other. The recesses 223a and 227a are provided with fixing bosses 223b and 227b, respectively.

The recesses 223a and 227a are formed at inner upper portions of the first and third sidewalls 223 and 227. Preferably, a pair of recesses 223a are formed in the first sidewall 223 with a predetermined interval, and a pair of recesses 227a are formed in the third sidewall 227 with a predetermined interval.

At least one fixing boss is formed at bottom of the recesses 223a, 227a. According to the present invention, fixing bosses 223b, 227b are formed in the bottom of the recesses 223a, 227a, respectively.

Tips of the fixing bosses 223b and 227b are preferably rounded or chamfered in order to allow the optical member 110 to be easily coupled to the second optical member 100.

As shown in FIG. 8, the lamp assembly 350 includes a lamp 310, a lamp holder (not shown) and a lamp cover 320.

The lamp 310 is preferably manufactured in a small size with long life span, while reducing heat-producing rate when generating light. For this reason, a cold cathode fluorescent lamp (CCFL) may be used.

The lamp cover 320 covers the lamp 310. The lamp cover 320 guides the light radiated from the lamp 310 to exit the light in substantially one direction.

To this purpose, the lamp cover 320 is manufactured by bending a plate made of material having superior reflectivity so as to surround a part of the lamp 310.

A pair of lamp holders are installed at both ends of the lamp 310 covered by the lamp cover 320.

The first optical member 360 varies the direction and optical distribution of the light generated from the lamp assembly 350.

To this end, according to the preferred embodiment of the present invention, the first optical member 360 has a rectangular parallelepiped shape that has four side faces, a light-reflecting surface, and a light-exiting surface.

The two opposite sidewalls of the optical module 400 are inserted into above-mentioned lamp covers 320 of the lamp assembly 350.

A light that is radiated from the lamp assembly 310 to have an optical distribution of a linear light source is reflected from the light-reflecting surface of the first optical member 360 to be changed into a light having an optical distribution of a surface light source. In addition, the first optical member 360 changes a proceeding direction of light. Specifically, the first optical member 360 receives a light radiated from the lamp assembly 310, guides a light reflected from the light-reflecting surface thereof to be exited at the light-exiting surface.

The second optical member 100 is installed on an upper surface of the first optical member 360. The second optical member 100 includes at least one sheet. The second optical member 100 includes a diffusion sheet for uniformly distributing brightness of the light radiated from the light-exiting surface of the second optical member 360, a prism sheet for enhancing a viewing angle of light, and a dual brightness enhanced film (DBEF).

The second optical member 100 having the above-structure may have the optical body 110 and fixing parts (140, 150).

The optical body 110 has rectangular parallelepiped shape to be easily accommodated in the receiving space of the receiving container 200. Thus, the optical body 110 has four side faces.

The fixing parts include the first fixing part 140 and the second fixing part 150.

The first fixing part 140 is formed at one side face 114 of the optical body 110. Preferably, pair of first fixing parts 140, which are separated from each other by a predetermined interval, are formed on the side face 114 of the optical body 110.

The second fixing part 150 is formed at the side face 112, which is opposite to the first fixing part 140, of the optical body 110. Preferably, a pair of second fixing parts 150, which are separated from each other by a predetermined interval, are formed at the side face 112 of the optical body 110.

Figure 10:
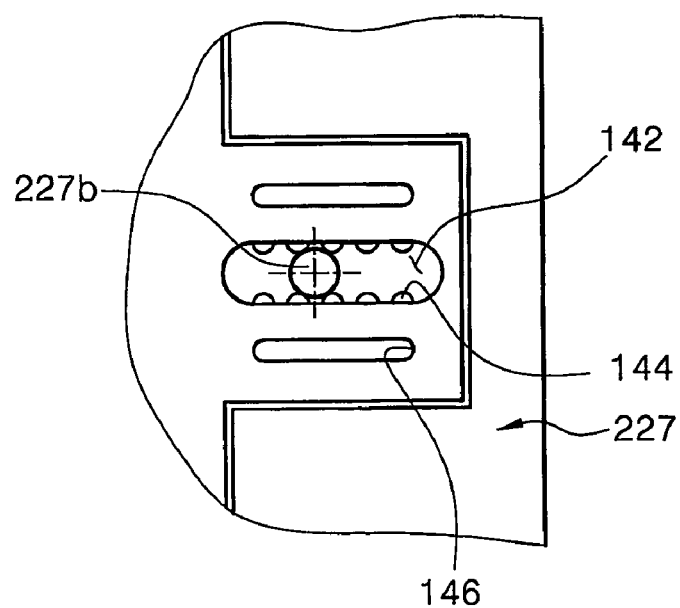
FIG. 10 is a plan view showing a first fixing part coupled to a fixing boss according to the present invention.

FIG. 10 is a plan view showing a first fixing part coupled to a fixing boss according to the present invention.

Referring to FIG. 10, the first fixing part 140 includes the fixing hole 142, the vibration attenuating protrusion 144 and the through-hole 146.

The fixing hole 142 extends in a main expanding direction of the optical body 110.

The vibration attenuating protrusion 144 is protruded from an inner surface of the fixing hole 142 toward a center of the fixing hole 142.

The above-mentioned fixing boss 227b is inserted into the fixing hole 142, and the fixing boss 227b makes contact with an outer surface of the vibration attenuating protrusion 144.

Figure 11:
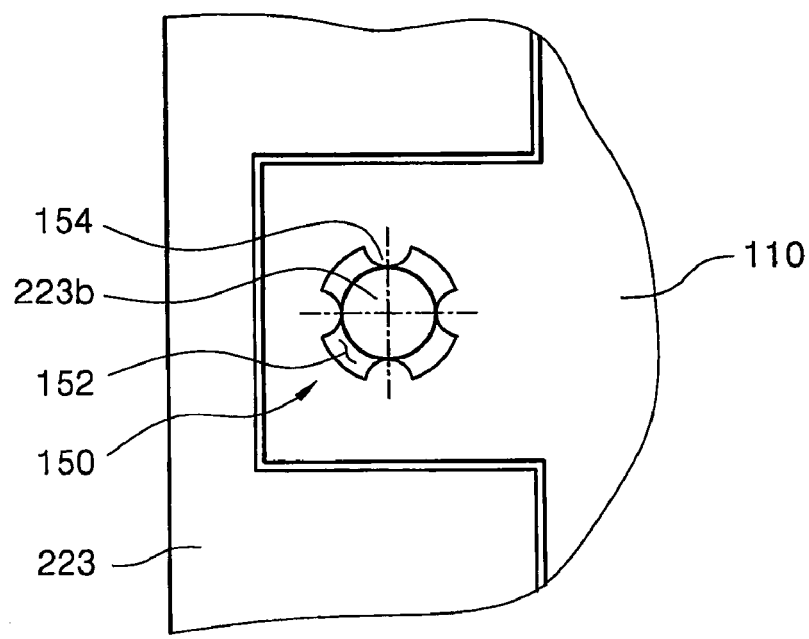
FIG. 11 is a plan view showing a second fixing part coupled to a fixing boss according to one exemplary embodiment of the present invention.

FIG. 11 is a plan view showing a second fixing part coupled to a fixing boss according to one exemplary embodiment of the present invention.

Referring to FIG. 11, the second fixing part 150 includes the cylindrical hole 152 and fixing protrusions 154. The cylindrical hole 152 has a diameter larger than an outer diameter of the fixing boss 223b.

At least two fixing protrusions 154 are protruded from an inner surface of the cylindrical hole 152 toward a center of the cylindrical hole 152 so as to maintain the fixing boss 223b substantially immovable within the cylindrical hole 152.

The fixing protrusions 154 allow the fixing boss 223b to be tightly fixed in the cylindrical hole 152.

Figure 12:
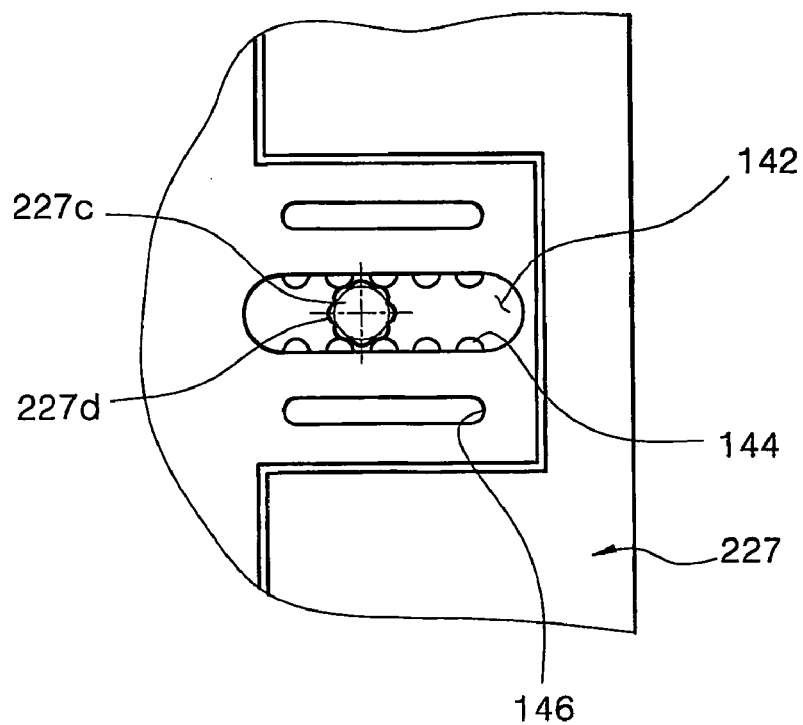
FIG. 12 is a plan view showing a first fixing part coupled to a fixing boss according to another exemplary embodiment of the present invention.

FIG. 12 is a plan view showing a first fixing part coupled to a fixing boss according to another exemplary embodiment of the present invention.

Referring to FIG. 12, similar to the fourth embodiment of the present invention, the first fixing part 140 includes the fixing hole 142, the vibration attenuating protrusion 144 and the through-hole 146.

The fixing boss 227c inserted into the fixing hole 142 has a plurality of protrusions 227d, which are formed at an outer surface of the fixing boss 227c. The protrusions 227d are engaged with the vibration attenuating protrusions 144, so that the vibration attenuating protrusions 144 can effectively attenuate external vibration.

Figure 13:
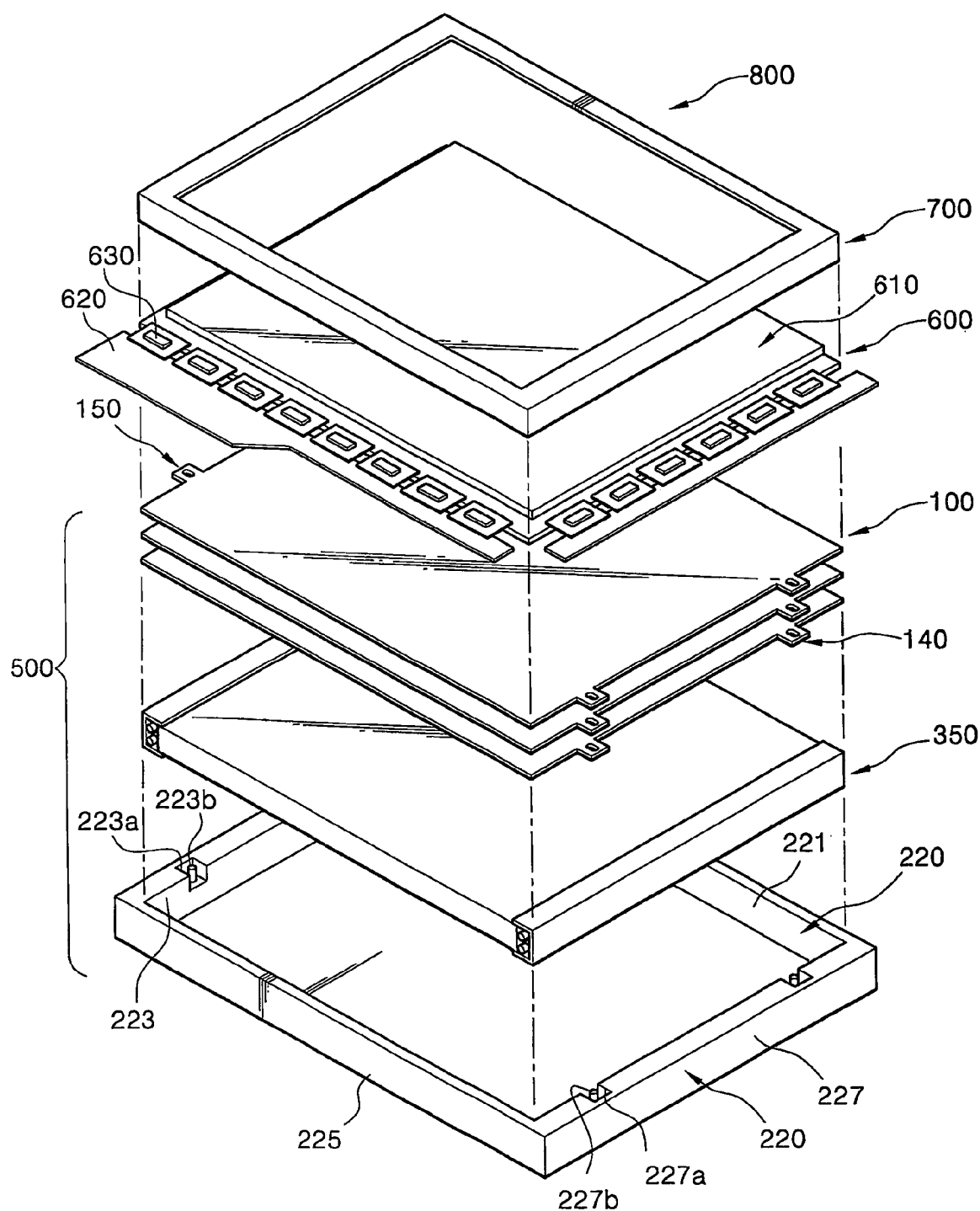
FIG. 13 is a perspective view showing a liquid crystal display device according to the present invention.

FIG. 13 is a perspective view showing a liquid crystal display device according to the present invention.

The optical members and the backlight assembly described in the first, second and third embodiments will not be further described below to avoid a redundancy. Referring now in specific detail to the drawings in which like reference numerals identify identical elements throughout the several views.

Referring to FIG. 13, the liquid crystal display device 800 mainly includes a backlight assembly 500, a liquid crystal display panel assembly 600 and a chassis 700.

The liquid crystal display panel assembly 600 is disposed on an upper surface of the second optical member 100, which is a part of the backlight assembly 500. The liquid crystal display panel assembly 600 is fixedly received in the receiving container 200.

The liquid crystal display panel assembly 600 includes a liquid crystal display panel 610 and driving modules 620 and 630.

The liquid crystal display panel 610 controls the quantity of the light that passes through the second optical member 100, such that the controlled light passes through color filters to display required images.

Figure 14:
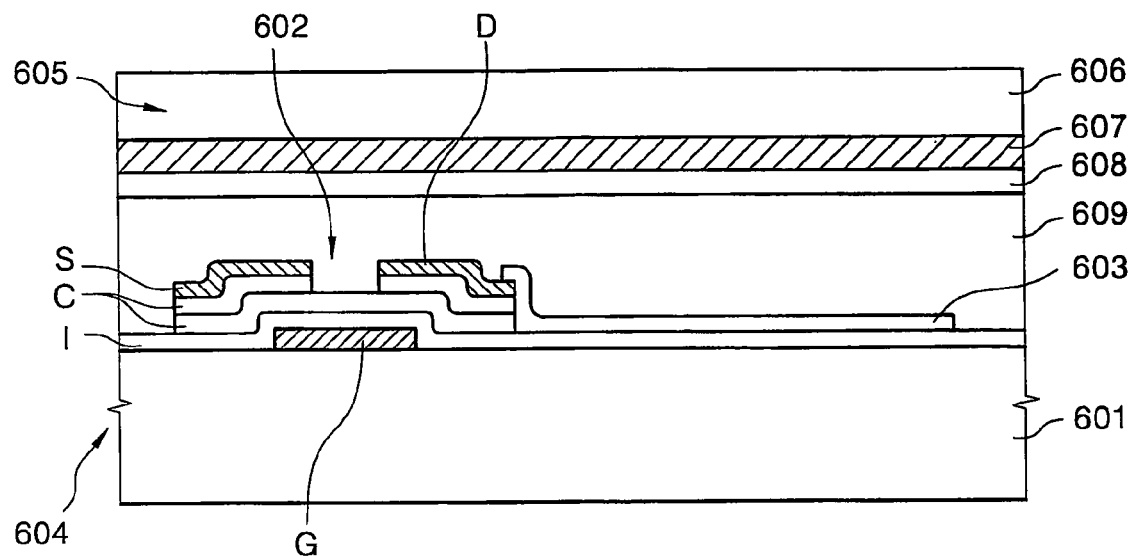
FIG. 14 is a sectional view showing a liquid crystal display panel of FIG. 13.
Figure 15:
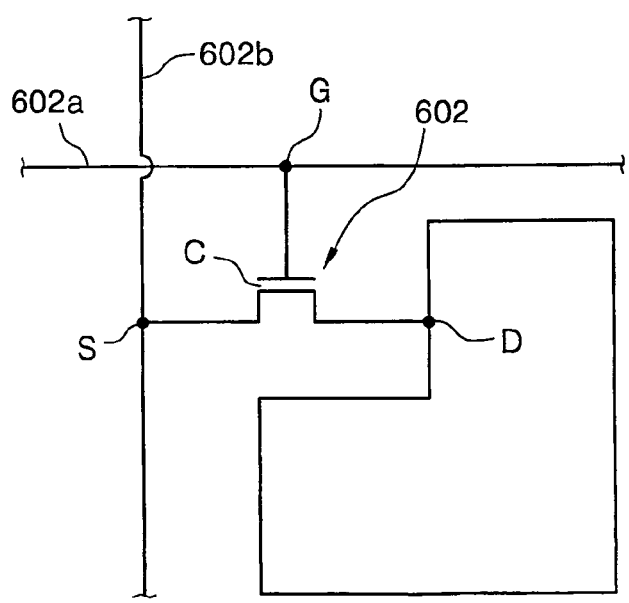
FIG. 15 is an equivalent circuit diagram of a TFT shown in FIG. 14.

FIG. 14 is a sectional view showing a liquid crystal display panel of FIG. 13, and FIG. 15 is an equivalent circuit diagram of a TFT shown in FIG. 14.

Referring to FIGS. 14 and 15, the liquid crystal display panel 610 includes the TFT substrate 604, liquid crystal 609 and a color filter substrate 605.

The TFT substrate 604 has an insulating substrate 601, thin film transistors 602, and pixel electrodes 603.

The thin film transistors 602 are arranged in a matrix shape on the insulating substrate 601 through a thin film manufacturing process.

In detail, the thin film transistor 602 includes a gate electrode G, an insulation layer I, a channel layer C, a source electrode S and a drain electrode D.

The pixel electrode 603 is electrically connected to the drain electrode D of the thin film transistor 602.

The pixel electrode 603 is comprised of transparent conductive material such as indium-tin-oxide (ITO) or indium-zinc-oxide (IZO).

In order to individually drive the thin film transistor 602 having the above-structure, the gate electrodes G belonging to a same row in the matrix type thin film transistors 602 are connected to one gate line 602a.

In addition, the source electrodes S belonging to a same column in the matrix type thin film transistors 602 are connected to one data line 602b.

Referring to FIG. 14, the color filter substrate 605 has a glass substrate 606, color filters 607 and a common electrode 608.

The color filters 607 are arranged in the insulating substrate 606 in a matrix shape in such a manner that each of the color filters 607 faces the corresponding pixel electrode 603. The color filters 607 are manufactured by mixing dye with photosensitive material. The color filters 607 includes a red color filter for selectively outputting light having a red wavelength, a green color filter for selectively outputting light having a green wavelength, and a blue color filter for selectively outputting light having a blue wavelength. For example, only one of the color filters is shown in FIG. 14.

The common electrode 608 is formed over the entire area of the insulating substrate 606 so as to cover the color filter 607, thereby allowing an electric field required for aligning the liquid crystal to be applied to the liquid crystal when power signal is applied to the pixel electrode 603.

The liquid crystal 609 is filled between the TFT substrate 604 and the color filter substrate 605, and then the liquid crystal 609 is sealed.

The driving modules 620 and 630 shown in FIG. 13 include a printed circuit board 620 having driver circuits for driving the liquid crystal display panel 610, and a tape carrier package 630 for connecting the printed circuit board 620 to the liquid crystal display panel 610.

The chassis 700 prevents the liquid crystal display panel assembly 600 from being separated from the receiving container 200, and protects the liquid crystal display panel assembly 600 from external impact.

While the present invention has been described in detail with reference to the preferred embodiments thereof, it should be understood to those skilled in the art that various changes, substitutions and alterations can be made hereto without departing from the scope of the invention as defined by the appended claims.

The invention claimed is:

1. An optical member of a liquid crystal display device, the optical member comprising:
    an optical body for varying an optical characteristic of a first light incident into the optical body to exit a second light; and
    a first fixing part protruded from at least one side face of the optical body, the first fixing part including a fixing hole and a vibration attenuating means, the fixing hole allowing a movement of the optical body in accordance with an expansion and a contraction of the optical body, and the vibration attenuating means formed on an inner surface of the fixing hole to attenuate an external vibration applied to the optical body.

2. The optical member as claimed in claim 1, wherein the first fixing part is formed on two side faces of the optical body, and the two side faces are opposite to each other.

3. The optical member as claimed in claim 1, wherein the vibration attenuating means includes at least one vibration attenuating protrusion, and the at least one vibration attenuating protrusion is protruded from the inner surface of the fixing hole toward a center of the fixing hole.

4. The optical member as claimed in claim 3, wherein at least one through-hole is formed on a portion of the first fixing part, and the portion is disposed near the fixing hole.

5. The optical member as claimed in claim 3, wherein at least one through-hole is formed on a portion of the first fixing part, and the portion is spaced apart from the fixing hole by a predetermined distance.

6. The optical member as claimed in claim 1, wherein the first fixing part is formed on a first side face of the optical body and a second fixing part is formed on a second side face of the optical body, and the second side face is opposite to the first side face.

7. The optical member as claimed in claim 6, wherein the second fixing part includes a cylindrical hole, and at least two fixing protrusions are protruded from an inner surface of the cylindrical hole toward a center of the cylindrical hole.

8. The optical member as claimed in claim 7, wherein the fixing hole is an elongated hole having a long axis in a main expansion direction of the optical body.

9. A backlight assembly comprising:
  a receiving container including i) a bottom face, ii) sidewalls protruded from edges of the bottom face to provide a receiving space, iii) a recess respectively formed on an upper portion of two opposite sidewalls of the receiving container, and iv) a fixing boss formed on a bottom surface of the recess and projected in parallel to the sidewalls;
  a lamp, received in the receiving container, for generating a first light;
  a first optical member, coupled to the lamp, for varying an optical characteristic of the first light to exit a second light; and
  a second optical member including i) an optical body for varying the optical characteristic of the second light incident into the optical body to exit a third light, and ii) a first fixing part protruded from at least one side face of the optical body, the first fixing part including a fixing hole and a first vibration attenuating means, and the vibration attenuating means formed on a first inner surface of the fixing hole and the first fixing part to attenuate an external vibration applied to the optical body.

10. The backlight assembly as claimed in claim 9, wherein the first vibration attenuating means includes at least one vibration attenuating protrusion, and the at least one vibration attenuating protrusion is protruded from the inner surface of the fixing hole toward a center of the fixing hole to contact with a portion of an outer surface of the fixing boss.

11. The backlight assembly as claimed in claim 10, wherein a second vibration attenuating means is formed on the outer surface of the fixing member to contact with the vibration attenuating protrusion.

12. The backlight assembly as claimed in claim 11, wherein the second vibration attenuating means includes at least one protrusion, the at least one protrusion is formed on the outer surface of the fixing boss to attenuate a vibration.

13. The backlight assembly as claimed in claim 9, wherein the first fixing part is formed on a first side face of the optical body and a second fixing part is formed on a second side face of the optical body, and the second side face is opposite to the first side face.

14. The backlight assembly as claimed in claim 13, wherein the second fixing part includes a cylindrical hole, and at least two fixing protrusions are protruded from an inner surface of the cylindrical hole toward a center of the cylindrical hole.

15. The backlight assembly as claimed in claim 9, wherein a tip of the fixing boss has a tapered shape.

16. The backlight assembly as claimed in claim 9, wherein at least one through-hole is formed on portions of the first fixing part, and each of the portions is adjacent to the first vibration attenuating means.

17. A liquid crystal display device comprising:
  a receiving container including i) a bottom face, ii) sidewalls protruded from edges of the bottom face to provide a receiving space, iii) a recess respectively formed on an upper portion of two opposite sidewalls of the receiving container, and iv) a fixing boss formed on a bottom surface of the recess and projected in parallel to the sidewalls;
  an optical module including a lamp and a first optical member, the lamp received in the receiving container to generate a first light, and the first optical member varying an optical characteristic of the first light to exit a second light;
  a second optical member including i) an optical body for varying the optical characteristic of the second light incident into the optical body to exit a third light, and ii) a first fixing part protruded from at least one side face of the optical body, the first fixing part including a fixing hole and a first vibration attenuating means, the fixing hole being elongated in a main expansion direction of the optical body to receive the fixing boss, and the vibration attenuating means being formed on an inner surface of the fixing hole to attenuate an external vibration applied to the optical body;
  a liquid crystal display panel assembly, disposed on the second optical member to be received in the receiving container, for changing the third light into a fourth light having image information; and
  a chassis, coupled to the receiving container on which the liquid crystal display panel assembly is received, for preventing the liquid crystal display panel assembly from being separated from the receiving container.

18. The liquid crystal display device as claimed in claim 17, wherein the first vibration attenuating means includes at least one vibration attenuating protrusion, and the at least one vibration attenuating protrusion is protruded from the inner surface of the fixing hole to contact with an outer surface of the fixing boss.

19. The liquid crystal display device as claimed in claim 17, wherein the first fixing part is formed on a first side face of the optical body and a second fixing part is formed on a second side face of the optical body, and the second side face is opposite to the first side face.

20. The liquid crystal display device as claimed in claim 19, wherein the second fixing part includes a cylindrical hole, and at least two fixing protrusions are protruded from an inner surface of the cylindrical hole toward a center of the cylindrical hole.

* * * * *